May 8, 1928.

LE ROY LACKEY

SCALE

Filed Sept. 20, 1926

1,668,774

INVENTOR.
Le Roy Lackey

BY

ATTORNEY.

Patented May 8, 1928.

1,668,774

UNITED STATES PATENT OFFICE.

LE ROY LACKEY, OF DETROIT, MICHIGAN.

SCALE.

Application filed September 20, 1926. Serial No. 136,397.

My invention relates to a new and useful improvement in a scale of the pivotal beam type, the present invention being an improvement on the structure shown in a prior application for a patent filed November 30th, 1925, Serial No. 72,225. The invention is adapted for use on scales of the rocking beam type in which a sliding poise is ordinarily used, the present invention being adapted primarily for use on scales in which the sliding poise is eliminated, although, as the description will illustrate, the invention may be equally well adapted for use on scales of various types, and particularly those in which the sliding poise is eliminated as in the structure shown in my prior application. The sliding mechanism will, of necessity, be as heavy as the old style poise and the loose weights combined so that it will require at times considerable force to move the sliding mechanism which replaces the sliding poise and the loose weights, so that it is quite difficult to obtain a fine degree of accuracy, and particularly as to fractional parts of specific units.

The present invention has as its object particularly a mechanism whereby an auxiliary poise member is used for fine adjustments to indicate the fractional parts of the units of weight or measurement used on the scale.

Another object of the invention is the provision of an auxiliary poise which may be easily and quickly moved relatively to the beam for counter balancing purposes and adjusted to a fine degree of accuracy and retained in its adjusted position.

Other objects will appear hereinafter.

The invention consists in the combination and arrangement of parts hereinafter described and claimed.

The invention will be best understood by a reference to the accompanying drawings which form a part of this specification and in which, Fig. 1 is a front elevational view showing the invention applied.

Figure 1:
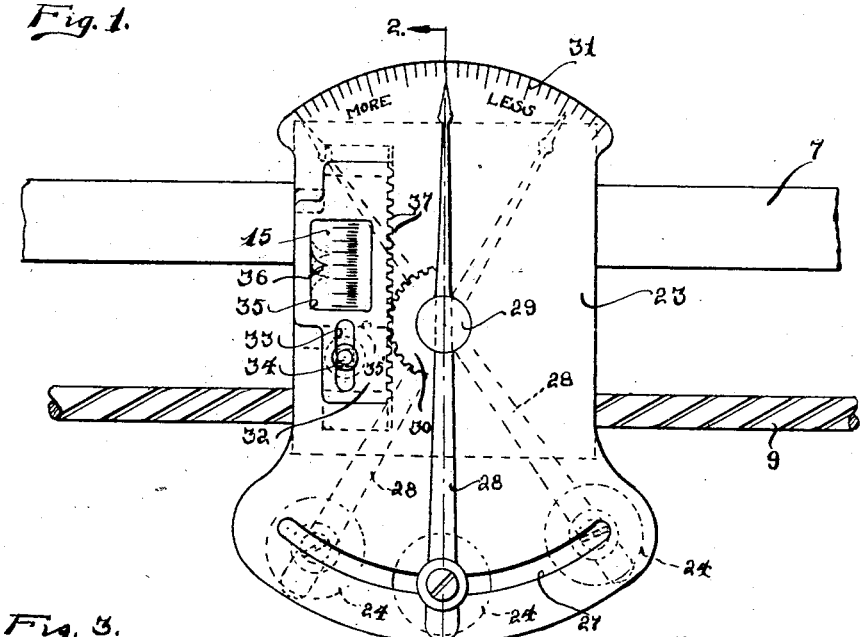
Figure 3:
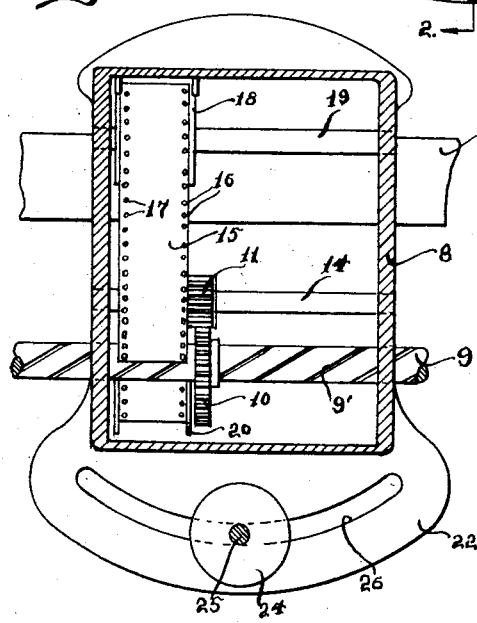
Fig. 3 is a sectional view taken on substantially line 3—3 of Fig. 2.
Figure 2:
Fig. 2 is a sectional view taken on substantially line 2—2 of Fig. 1.

In the drawings I have illustrated a rockable beam 7 extending parallel to which and spaced therefrom is a spirally grooved shaft 9. In operation, as shown in my prior structure, this shaft 9 is connected by suitable supports to the beam 7. A housing 8 is provided through which the beam 7 and the shaft 9 project, this housing 8 being slidable on the beam 7 and the shaft 9. Rotatably mounted within the housing 8 and on the shaft 9 is a gear 10 provided with inwardly projecting lug 10' which is adapted to engage in the spiral groove 9' formed on the shaft 9, so constructed that upon an axial movement of the shaft 9 relatively to the wheel 10, the wheel 10 will be rotated, the direction of rotation depending upon the direction of axial movement of the shaft 9. The gear 10 is adapted to mesh with a gear 11 fixedly mounted upon a shaft 14 which is suitably journalled in the side walls of the housing 8. The gear 11 is carried by a drum 12, the gear 11 and the drum 12 being in fixed relation to each other. This drum 12 is provided on its periphery with teeth 13 adapted to engage in the openings 16 and 17 formed in the flexible strip 15. One end of the flexible strip is suitably secured to a drum 18 which is mounted on the shaft 19. The other end of the strip 15 is connected to a drum 20 which is mounted on the shaft 21.

This housing with the mechanism contained therein is used to form a part of the poise which is slidable on the beam 7, and the strip 15 which is visible through an opening 35' formed in the housing, serves to indicate the weight, the proper relation and co-ordination existing between the graduations on the strip 15 and the weight of the housing and mechanism and the beam 7. It is evident that upon movement of the housing axially of the shaft 9 the rotation of the drums 20 and 18 will be effected, these drums being spring wound to wind the flexible strip thereon, the construction being of a well-known type similar to a shade roller construction.

The present invention is adapted for use in conjunction with the mechanism described. Mounted on the rear of the housing 8 is a supporting member 22 which is adapted to project downwardly beyond the bottom of the housing 8. A similar supporting member 23 is mounted on the forward wall of the housing and projects below the bottom thereof. Mounted between the lower ends of the supporting members 22 and 23 is a weight 24 which is preferably formed cylindrical and which is mounted on a shaft 25 projected through a slot 26 formed in the member 22 and through a slot 27 formed in the member 23. A pointer 28 is also connected at one end to the shaft 25 and pivoted, intermediate its ends, on the forward wall of the housing by means of a stud 29 to which it is fixedly connected. Projecting outwardly from this stud 29 is a toothed segment 30 which is in fixed relation to the stud 29. The upper end of the pointer 28 terminates adjacent the upper end of the member 23 which is provided with graduations 31, these graduations being used to indicate fractional means, and at one side of the vertical medial line of the member 23 the graduations indicate an excess over a predetermined unit, and at the other side a deficit of a certain amount in fractional parts.

A plate 32 provided with an elongated slot 33 through which projects a stud 34 fastened to the member 23 and the front wall of the housing is slidably mounted on the outer surface of the support 23. This plate is provided with an opening 35 which is adapted normally to register with the opening 35' so that the flexible member 15 may be visible therefrom. Projecting inwardly from one edge of the opening 35 is a pointer 36. Formed on one edge of the member 32 are teeth 37 adapted to mesh with the teeth of the segment 30. When the housing and the mechanism is moved longitudinally of the beam 7 the flexible member 15 will be moved to indicate through the opening 35' by means of the graduations appearing on the member 15, the approximate weight in units of measurement. The weight 24 may then be moved either to the right or left as shown in dotted lines in Fig. 1 so that the fractional parts of the measuring unit will be indicated, the pointer 36 moving upwardly or downwardly as the case may be to indicate these fractional parts. In this way, the operator in adjusting the poise forming housing and its mechanisms need not regard other adjustments than the adjustments as to whole units, the adjustment effected through the movement of the weight 24 regulating as to fractional parts of the unit of measurement. In this way, the operator may more easily and quickly adjust the scale for measuring and may more accurately determine the weight of the article weighed.

While I have illustrated and described the preferred form of my invention, I do not wish to limit myself to the precise form of structure shown, but desire to avail myself of such variations and modifications as may come within the scope of the appended claims.

Having thus described my invention what I claim as new and desire to secure by Letters Patent is:

1. In a scale mechanism of the class described adapted to be supported by a scale beam, an auxiliary counter poise; a pointer pivotally mounted, intermediate its ends, and connected adjacent one end to said counter poise; and means for moving said counter poise in either direction relatively to the vertical.

2. In a scale mechanism of the class described adapted for mounting on a scale beam, supporting members in spaced relation, each of said supporting members having a slot formed therein in alignment with a slot formed in the other; a counter poise positioned between said supporting members; a pin projected through said counter poise and engaging in each of said slots; and means engaging with said pin for moving said counter poise relatively to said supporting members at either side the medial vertical line thereof.

3. In a scale mechanism of the class described adapted for mounting on a scale beam, a pair of spaced supporting members, each provided with an arcuate slot in alignment with a similar slot formed in the other; a counter poise positioned between said supporting members; supporting means for said counter poise engaging in each of said slots; a pointer connected at one end to said supporting means and pivoted, intermediate its ends, on one of said supports, said pointer being rockable on its pivot for moving said counter poise to either side of the vertical.

4. In a scale mechanism of the class described adapted for mounting on a scale beam, a pair of spaced supporting members, each provided with an elongated arcuate slot in alignment with a similar slot formed in the other; a counter poise positioned between said supporting members; a pin projected through said counter poise and engaging in each of said slots; a pointer pivotally mounted, intermediate its ends on one of said supports, and connected adjacent one end to said pin; a toothed segment carried by said pointer adjacent its center; a dial plate; teeth on said dial plate meshing with the teeth of said segment, said dial plate being movable upon movement of said pointer on its pivot.

5. In a scale mechanism of the class described adapted for mounting on a scale beam, a pair of spaced supporting members, each provided with an elongated arcuate slot in alignment with a similar slot formed in the other; a counter poise positioned between said supporting members; a pin projected through said counter poise and engaging in each of said slots; a pointer pivotally mounted, intermediate its ends on one of said supports, and connected adjacent one end to said pin; a toothed segment carried by said pointer adjacent its center; a dial plate; teeth on said dial plate meshing with the teeth of said segment, said dial plate being movable upon movement of said pointer on its pivot; and means on said pointer for effecting a movement of said pointer on its pivot.

In testimony whereof I have signed the foregoing.

LE ROY LACKEY.